D. R. MURPHY.
WHEEL HUB LOCKING DEVICE.
APPLICATION FILED FEB. 19, 1920.

1,384,083.

Patented July 12, 1921.
2 SHEETS—SHEET 1.

Inventor
Daniel R. Murphy
By Lloyd W. Patch
his Attorney

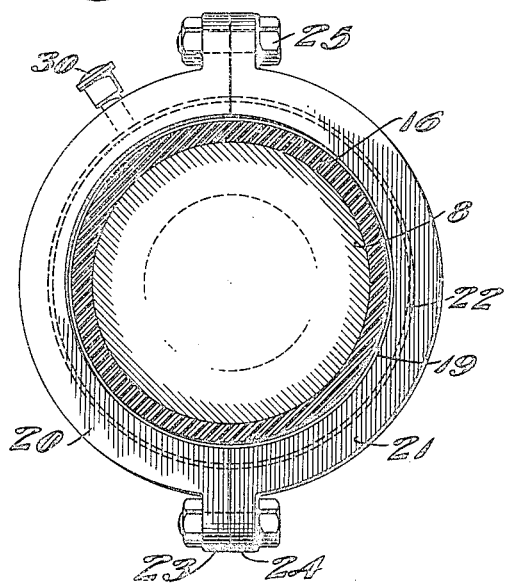
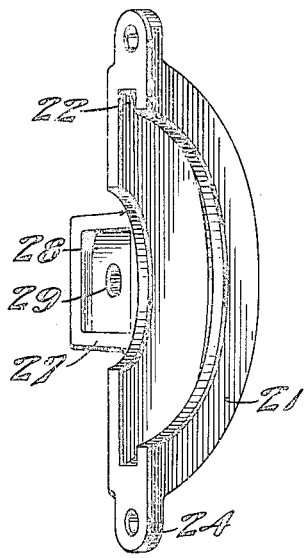
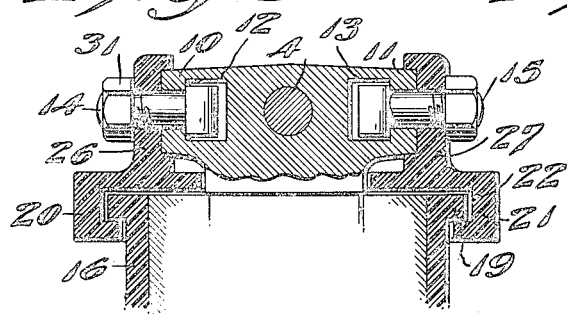
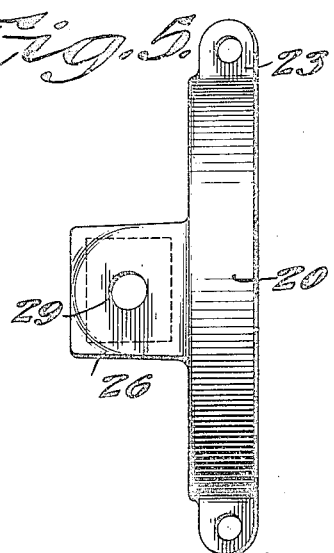
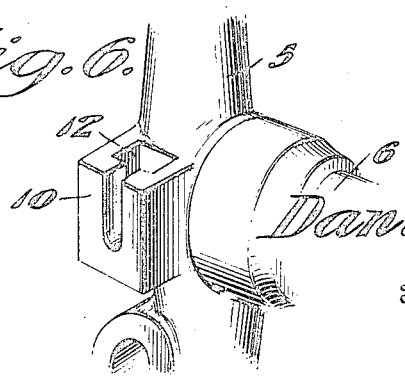

UNITED STATES PATENT OFFICE.

DANIEL R. MURPHY, OF UNIONTOWN, PENNSYLVANIA, ASSIGNOR OF ONE-HALF TO R. M. FRY, OF UNIONTOWN, PENNSYLVANIA.

WHEEL-HUB-LOCKING DEVICE.

1,384,083.

Specification of Letters Patent.

Patented July 12, 1921.

Application filed February 19, 1920. Serial No. 359,858.

*To all whom it may concern:*

Be it known that I, DANIEL R. MURPHY, a citizen of the United States, residing at Uniontown, in the county of Fayette, State of Pennsylvania, have invented new and useful Improvements in Wheel-Hub-Locking Devices, of which the following is a specification.

My present invention pertains to a wheel hub locking device, and particularly to a device of the character intended for application to the hub and spindle structure of the steering wheel of a motor vehicle.

An object of the invention is to provide a locking device including mechanical interlocking parts associated with the hub and the spindle of the wheel of a motor vehicle by which the wheel hub is positively locked and held against coming off while the vehicle is in motion, thus absolutely eliminating the danger of accidents occurring through this cause.

A further object is to so construct the parts that in case the bearing spindle breaks or the usual wheel fastening becomes loose and ineffective, the wheel will remain in position and will have revoluble mounting, thereby giving the driver sufficient time to stop the vehicle and avoid accident even at a high rate of speed of traveling.

Yet another object resides in arranging the interlocking structure to take end thrusts imparted to the hub when the wheel is turned to guide the vehicle, thus relieving strain and wear upon the bearings and the spindle and hub portions.

A still further purpose lies in so constructing and arranging the various parts that while accidental or casual displacement of the wheel is precluded, the construction is such that the wheel can be readily and quickly removed with the use of ordinary tools.

With these and other objects in view which will be apparent from the drawings, specification and claims, this invention includes certain novel features of construction and combinations of parts which will now be set forth.

In the drawings:

Fig. 2 is a vertical sectional view substantially on line 2—2 of Fig. 1.

Fig. 3 is a fragmentary horizontal section on line 3—3 of Fig. 1.

Fig. 4 is a view in perspective looking at the inner side of one of the casing members.

Fig. 5 is a view in elevation of the casing member.

Fig. 6 is a fragmentary perspective view to better show the setting for the casing retaining bolts.

Figure 1:
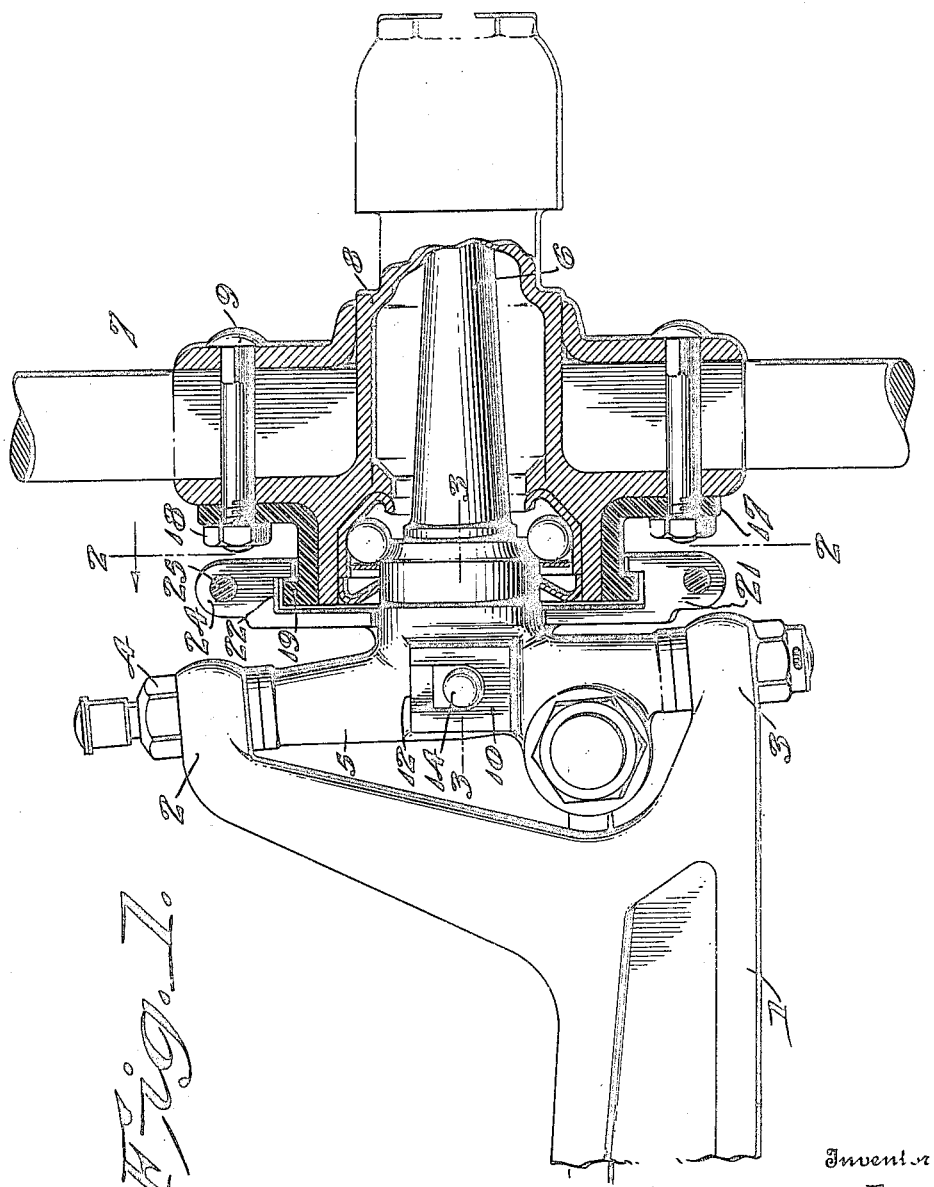
Figure 1 is a sectional view through the hub of the front wheel of a vehicle fitted upon a spindle, showing my invention applied thereto.

The front axle 1 of the vehicle is of any desired type and construction, and has the bearings 2 and 3 to receive spindle bolt 4 by which the post 5 of the bearing spindle 6 is mounted to have swinging movement for the steering of the vehicle. The wheel 7 has its hub 8 made of the usual construction, and hub bolts 9 are provided to retain the parts in proper assembly and to secure the spokes of wheel 7 in place.

The parts as hereinabove described are all standard portions of a motor vehicle, and can be made up in any desired construction. Bearings of suitable type are provided between the hub and spindle, and any form of fastening can be employed to hold the hub on the spindle. The disclosure of these parts in the drawings is only one possible construction, which has been selected to illustrate the construction and the embodiment of my invention, and as the description progresses it will be apparent that the device can be embodied with like facility and will operate with equal efficiency in conjunction with other forms and designs of construction. Also, while I have here shown a wood wheel, it will be apparent that my hub locking device can be applied in conjunction with wire and steel wheels.

In making up the spindle structure, the extensions 10 and 11 are formed on opposite sides of bearing post 5, substantially in line with bearing spindle 6, and projecting at right angles thereto. These extensions, as best shown in Fig. 6, are provided with T-shaped slots 12 and 13, which receive the heads of retaining bolts 14 and 15. By providing the slots and loosely fitting the bolts thereto, either of these retaining bolts can be readily replaced should it become broken or so worn as to be unfit for service.

A hub bearing member includes sleeve portion 16 to fit snugly around the inner end of hub 8 and provided with a bearing flange 17 flaring at its outer end and provided with openings to receive hub bolts 9. The usual nuts 18 are provided on hub bolts 9 and these nuts clamp and hold the hub bearing member in rigid mounting on the hub. At its inner end the sleeve 16 has a peripheral bearing flange 19.

Casing members 20 and 21, which are semi-circular in shape, have bearing recesses or openings in their outer faces to receive the inner end of sleeve 16 and have the groove 22 formed around the recess to receive bearing flange 19. These semi-circular casing members have projecting ears 23 and 24, and fastening bolts 25 are passed therethrough to fasten the casing members together around the inner end of sleeve 16, in which relation bearing flange 19 is revolubly received in the circular groove 22 formed by the association of the two casing members.

The casing members 20 and 21 are provided with retaining ears 26 and 27 on their inner sides which are recessed as at 28 to receive the ends of extensions 10 and 11, openings 29 being provided for retaining bolts 14 and 15.

In the construction of the parts the bearing flange 19 and groove 22 are gaged as to width so that flange 19 has a free turning fit but is held against excessive end movement in either direction within the groove, and if desired an oil or grease cup 30 may be provided on one of the casing members to supply a lubricant to the groove 22.

In the use of the parts they are assembled and fitted in the manner described and, as shown in Fig. 1, the casing members embrace bearing flange 19 of sleeve 16 as a journal or bearing. Sleeve 16 is secured in conjunction with the hub structure by hub bolts 9 and the ears 26 and 27 of casing members 20 and 21 being fitted with their recesses 28 snugly receiving the ends of extensions 10 and 11 and with the nuts 31 of retaining bolts 14 and 15 clamped thereagainst, these casing members are retained in rigid mounting on the spindle post 5. As the wheel revolves, with the vehicle traveling in a straight line, bearing flange 19 turns freely within groove 22 without end thrust upon the casing members. But, when the spindle structure is turned upon the spindle bolt 4 to steer the vehicle in either direction bearing flange 19 will exert end thrust upon the casing structure. Through the rigid mounting of the casing structure this end thrust is borne and pressure and strain upon the bearings and upon the usual wheel fastening is relieved. Further, in addition to interlocking the wheel hub and spindle structure to retain the wheel in place upon the bearing spindle, this structure provides an auxiliary bearing to guard against accident and against the wheel coming off even though the bearing spindle 6 should break close up toward the spindle post. Where the device is installed upon an automobile as manufactured the bearing flange 19 may be formed on the wheel hub.

While in the foregoing I have described specific embodiments, and have mentioned only certain possible modifications, it will be appreciated that my purpose is to provide an interlocking bearing connection between the wheel hub and the spindle post by which all possibility of the wheel coming off is precluded, in view of this it is understood that in practice I do not limit myself to such specific details as herein set forth, but may resort to any practical modifications falling within the scope of the invention as defined in the appended claims.

I claim:

1. A hub locking device including with an axle having a bearing spindle, a hub mounted on said spindle and provided with a bearing flange concentrically around the spindle bearing, a pair of casing members fitted around the axle and having bearing flanges interfitting with the flange of the hub, and bolts carried by said axle to rigidly secure the casing members against movement thereon.

2. A wheel hub locking device including with a wheel hub having a bearing flange around its inner end, an axle having a bearing spindle on which said wheel hub is received revolubly, extensions formed on opposite sides of said axle substantially at right angles to said spindle, a pair of casing members having bearing recesses to receive the inner end of the hub and provided with a groove to take said bearing flange, means to fasten said casing portions in interfitted relation to form a journal and end thrust bearing for said bearing flange, and retaining bolts held by said extensions to secure the casing structure in fixed mounting upon the axle.

3. A wheel hub locking device including with a sleeve to be mounted in conjunction with the wheel hub and having a peripheral bearing flange, an axle by which the bearing spindle receiving the hub is mounted provided with extensions on opposite sides thereof slotted to removably receive retaining bolts, a pair of casing members of substantially semi-circular form having bearing recesses and grooved to receive and provide a bearing for said bearing flange, means by which said casing members are fastened in interfitted relation over said flange, and ears formed in conjunction with said casing members recessed to receive the ends of the extensions on the axle and adapted to be rigidly held in place thereon by said retaining bolts.

In testimony whereof I affix my signature.

DANIEL R. MURPHY.